Figure 1:
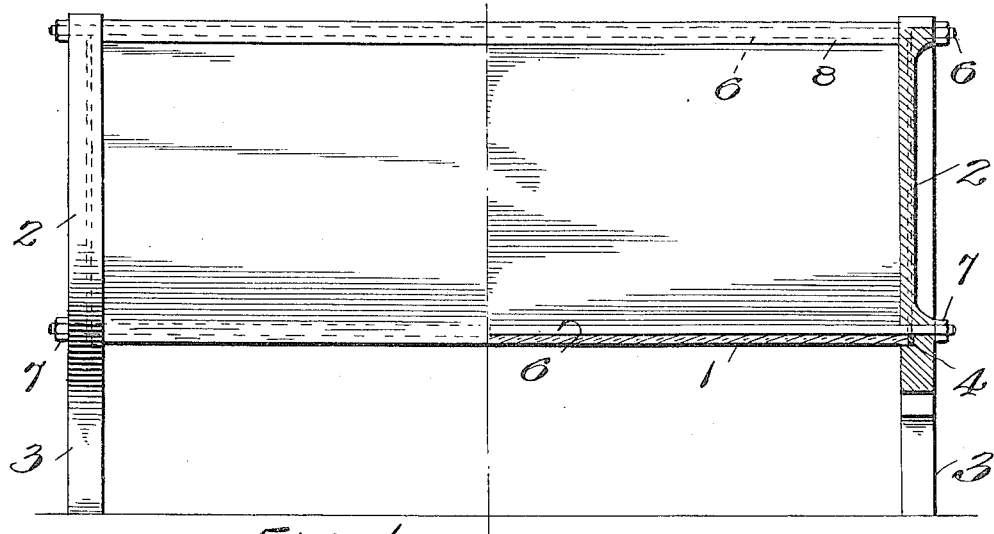

E. C. ELY.
AQUARIUM.
APPLICATION FILED SEPT. 9, 1913.

1,127,976.

Patented Feb. 9, 1915.

Witnesses
C. K. Davis
W. B. Brock

Inventor
E. C. Ely
By Brock, Baker & Smith
Attorneys

THE NORRIS PETERS CO., PHOTO-LITHO., WASHINGTON, D. C.

UNITED STATES PATENT OFFICE.

EDGAR C. ELY, OF CARBONDALE, PENNSYLVANIA.

AQUARIUM.

1,127,976.

Specification of Letters Patent.

Patented Feb. 9, 1915.

Application filed September 9, 1913. Serial No. 788,871.

*To all whom it may concern:*

Be it known that I, EDGAR C. ELY, a citizen of the United States, residing at Carbondale, Pennsylvania, have invented a new and Improved Aquarium, of which the following is a specification.

The purpose of my invention is to provide an aquarium of novel form providing an improved display of its contents.

The characteristics and advantages of the invention will be fully pointed out so far as is necessary in connection with a detailed description of the drawing, which illustrates one exemplifying embodiment of the invention. It is to be understood, however, that the invention is capable of embodiment in different forms.

Figures 2, 3, 4:
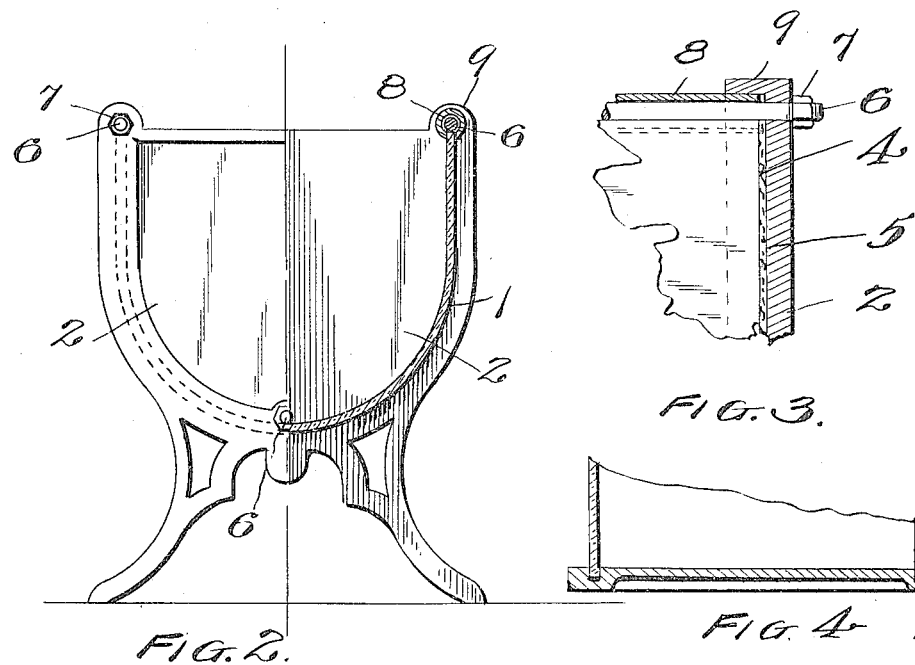

In the drawing: Figure 1 is a side view, half in section and half in elevation. Fig. 2 is an end view, half in section and half in elevation. Fig. 3 is an enlarged sectional detail in the vertical plane of one of the top bolts. Fig. 4 is a fragmentary horizontal section at one end of the structure.

Reference character 1 designates the glass aquarium body of relatively long trough form. The body, preferably, has an open top and is approximately semicylindrical, or U-shaped in cross-section, although the cross sectional shape may vary somewhat. The ends are open and the glass body may be defined in one way as an open-ended, open top trough or semi-cylinder of glass. The body is provided with two end plates or standards 2, of which the principal parts conform approximately to the outline of the ends of the glass body, but are slightly larger, and these standards are usually provided with legs 3. In each of the end plates is a channel 4, into which the ends of the glass body fit. At the bottom of each channel is a gasket 5. The whole structure is drawn together so that the gaskets are tightly clamped on the ends of the glass body to make the trough water-tight, by bolts 6, two of which are at the tops of the sides of the glass trough and one is at the bottom within the trough. These bolts are provided with nuts 7, and suitable waterproofing may be placed under the nuts of the lower bolt to prevent water from leaking out at this point.

To improve the sightliness of the whole structure, the upper bolts 6 and the upper edges of the glass body are preferably concealed by metal tubes 8, through which the bolts pass. These tubes are cut away at one side to overlap the upper edges of the glass body. The tubes extend at the ends into enlargements of channels 4 in the end plates, the end plates being provided to accommodate these tubes with extensions 9 surrounding said enlargements of the channels. The bottom bolt 6 may be entirely concealed from view through the glass by sand, stones, vegetation, or other articles placed within the aquarium when the latter is in use.

An aquarium constructed as above described presents a relatively long and deep body of water, every portion of which may be viewed clearly through the unbroken sides of the vessel. The vessel comprises in addition to the glass body, substantially only two end plates and fastening bolts, and the water-proof joints are limited to two— those provided by the gaskets at each end of the body.

It is highly desirable that the lower tension tie rod 6 be located within the semicylindrical glass wall of the aquarium in such position that it may be completely covered by the sand, rock, or marine plants forming its bottom when in use. The full variably-magnifying effect of the curving glass wall in conjunction with the water within, as the fish swim about, is not intercepted or modified as it would be were the tension rod placed exteriorly of the glass wall.

The semicylindrical shape of the body renders it sufficiently stiff so that it can well withstand the considerable pressure placed upon it by tightening the bolts to properly compress the gaskets and make the structure perfectly water-tight. Owing to this shaping of the body, also the hydraulic pressure exerted against it is substantially the same at all points and there is practically no tendency to bend or bulge the body and move it in relation to the packing by hydraulic pressure. The location of the bolt 6 is of great importance mechanically as well as for artistic appearance, because this inner location of the bolt brings the line of strain closer to the longitudinal center of the structure and distributes the strain more effectively through a large part of the wall of the glass body, and, in fact, I have found it possible by locating this bolt in the body and near the bottom thereof to satisfactorily clamp the end pieces by the use of a single lower bolt, or three bolts for the entire structure. An aquarium constructed as above has considerable flexibility. When placed on a slightly uneven base the end pieces may move slightly in relation to each other, permitting the aquarium to rest firmly and without any injurious additional strain to the glass body, this twisting of the structure being permitted by slight flexure of the bolts and by the flexible packing, and in some cases possibly by slight bending of the glass body itself, which in the described structure may take place without disadvantageous results.

I claim:

An aquarium comprising a body consisting of a single piece of glass in substantially semicylindrical form, end pieces placed at the open ends of the body, tension rods near the top edges of the body connecting the end pieces, a tension rod passing through and within the body near the bottom thereof and connecting the end pieces, and waterproofing packing between the ends of the glass body and the end pieces.

EDGAR C. ELY.

Witnesses:
HELEN M. MCANDREW.
G. FRANK COUCH.

Copies of this patent may be obtained for five cents each, by addressing the "Commissioner of Patents, Washington, D. C."